US005243764A

United States Patent [19]

Wieland

[11] Patent Number: 5,243,764

[45] Date of Patent: Sep. 14, 1993

[54] MOTOR-DRIVEN CHAIN SAW

[75] Inventor: Dieter Wieland, Remseck, Fed. Rep. of Germany

[73] Assignee: Andreas Stihl, Waiblingen, Fed. Rep. of Germany

[21] Appl. No.: 963,078

[22] Filed: Oct. 19, 1992

[30] Foreign Application Priority Data

Oct. 19, 1991 [DE] Fed. Rep. of Germany ....... 4134640

[51] Int. Cl.[5] .............................................. B23D 57/00

[52] U.S. Cl. .......................................... 30/383; 30/381

[58] Field of Search .......................... 30/383, 382, 381

[56] References Cited

U.S. PATENT DOCUMENTS

| | | | |
|---|---|---|---|
| 3,224,473 | 12/1965 | Dobbertin et al. | 30/383 |
| 3,967,698 | 7/1976 | Smith et al. | 30/382 |
| 4,010,544 | 3/1977 | Siman | 30/381 |
| 4,662,071 | 5/1987 | Höppner et al. | 30/381 |

FOREIGN PATENT DOCUMENTS

| | | | |
|---|---|---|---|
| 1901182 | 9/1964 | Fed. Rep. of Germany . | |
| 3201648 | 9/1983 | Fed. Rep. of Germany | 30/381 |
| 2098272 | 11/1982 | United Kingdom | 30/383 |

*Primary Examiner*—Douglas D. Watts
*Assistant Examiner*—Hwei-Siu Payer
*Attorney, Agent, or Firm*—Walter Ottesen

[57] ABSTRACT

The invention is directed to a motor-driven chain saw having a housing and a drive motor mounted in the housing for driving a sprocket wheel. The sprocket wheel, in turn, drives a saw chain guided around the periphery of a guide bar. The flat guide bar projects forwardly in the longitudinal direction of the chain saw and has a rearward end facing toward the sprocket wheel. Stud bolts fixed to the housing lie perpendicularly to the guide bar and project therethrough. The stud bolts also extend through a sprocket wheel cover laterally closing off the housing. The stud bolts have projecting free ends carrying respective nuts. In this way, the rearward end of the guide bar can be tightly clamped between the housing and the sprocket wheel cover. The stud bolts have respective other ends facing away from the guide bar which are tightly seated in the engine block of the drive motor. In this way, the loads acting on the guide bar can be taken up without danger of causing fractures in the housing.

8 Claims, 2 Drawing Sheets

MOTOR-DRIVEN CHAIN SAW

BACKGROUND OF THE INVENTION

The drive motor of a motor-driven chain saw is fixedly mounted in a housing of the chain saw by means of threaded fasteners. The flat guide bar is securely clamped between the sprocket wheel cover and the housing of the chain saw and threaded studs are threadably engaged in the housing so as to lie perpendicularly to the guide bar. The threaded studs extend through the end of the guide bar to be clamped and through the sprocket wheel cover. The studs carry nuts which are tightened. The forces acting on the guide bar are taken up by the housing of the chain saw. The housing comprises primarily plastic and must therefore be dimensioned correspondingly thick; however, fatigue fissures can develop in the housing because of the stress to which the housing is subjected and especially from vibrations occurring when using internal combustion engines. The housing is exchanged when such fatigue fissures develop.

SUMMARY OF THE INVENTION

It is an object of the invention to improve the motor-driven chain saw described above so that the stresses acting on the guide bar can be received without the danger of a fracture occurring in the housing.

The motor-driven chain saw of the invention defines a longitudinal axis and includes: a drive motor having a motor block; a housing for accommodating the drive motor therein; a saw chain; a guide bar extending in the direction of the axis and defining a guide path for guiding the saw chain in its movement around the guide bar; the guide bar having a rearward end portion at which the guide bar is mounted on the housing; a sprocket wheel disposed behind the rearward end portion and being in engagement with the saw chain; the sprocket wheel being operatively connected to the drive motor for driving the saw chain; a sprocket wheel cover laterally covering the housing with the rearward end portion being disposed between the cover and the housing; at least one stud bolt having a free end and extending through the rearward end portion and the sprocket wheel cover so as to cause the free end to extend through the sprocket wheel cover; a nut arranged on the free end for clamping the rearward end portion between the cover and the housing; the stud bolt having an anchor end opposite the free end; the stud bolt having a mid section between the rearward end portion and the motor block; the anchor end and the motor block conjointly defining holding means for tightly holding the stud bolt in the motor block; the housing having a through opening formed therein; the stud bolt extending through the through opening of the housing so as to be held firmly in the motor block by the holding means with the mid section being disposed in the through opening; and, the stud bolt having collar means formed thereon between the mid section and the free end for contact engaging the housing so as to axially clamp the housing to the motor block when the stud bolt is fixedly held in the motor block by the holding means.

To direct away the forces of the stresses acting on the guide bar, the guide bar and the motor block of the drive motor via the stud bolts conjointly define a unit made of metal. The housing is clamped axially between the motor block and the guide bar so that the chain saw housing made of plastic defines a unit together with the guide bar, the stud bolts and the motor block.

The center section of the stud bolt is preferably disposed in the pass-through opening without radial play so that a relative movement between the housing and the stud bolts is prevented.

According to a preferred embodiment of the invention, the drive motor is an internal combustion engine with the stud bolt, in the region of the crankcase, preferably engaging the lower crankcase shell of the engine block. The appendage for receiving the stud bolt is cast as one piece on the lower crankcase shell.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
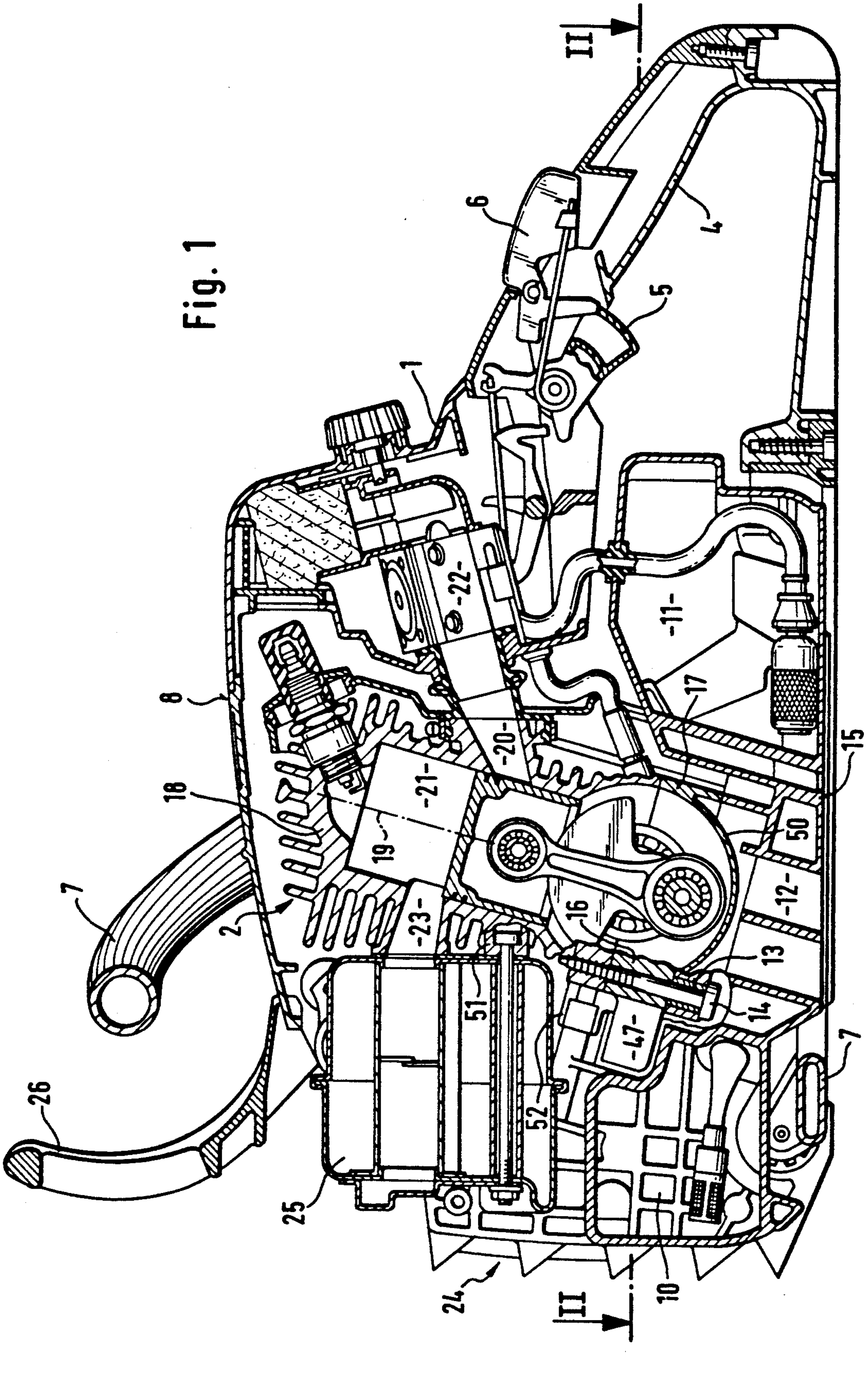
FIG. 1 is a side elevation view of a motor-driven chain saw taken along line I—I of FIG. 2; and, FIG. 2 is a plan view of the motor-driven chain saw of FIG. 1 taken along line II—II in FIG. 1.

The motor-driven chain saw shown in the drawings includes a housing 1 wherein a drive motor in the form of an internal combustion engine 2 is mounted for driving a sprocket wheel 3. In the embodiment shown, the internal combustion engine is configured as a two-stroke engine. An electric motor can also be used as a drive motor.

A rearward handle 4 is arranged on the housing 1 of the motor-driven chain saw and extends in the longitudinal direction thereof. A throttle lever 5 and a throttle-lever latch 6 are pivotally journalled in the rearward handle 4. A forward handle 7 extends over the top side 8 of the housing and extends in spaced relationship to a lateral housing surface 9 of the chain saw 1 to the housing base 15.

Figure 2:
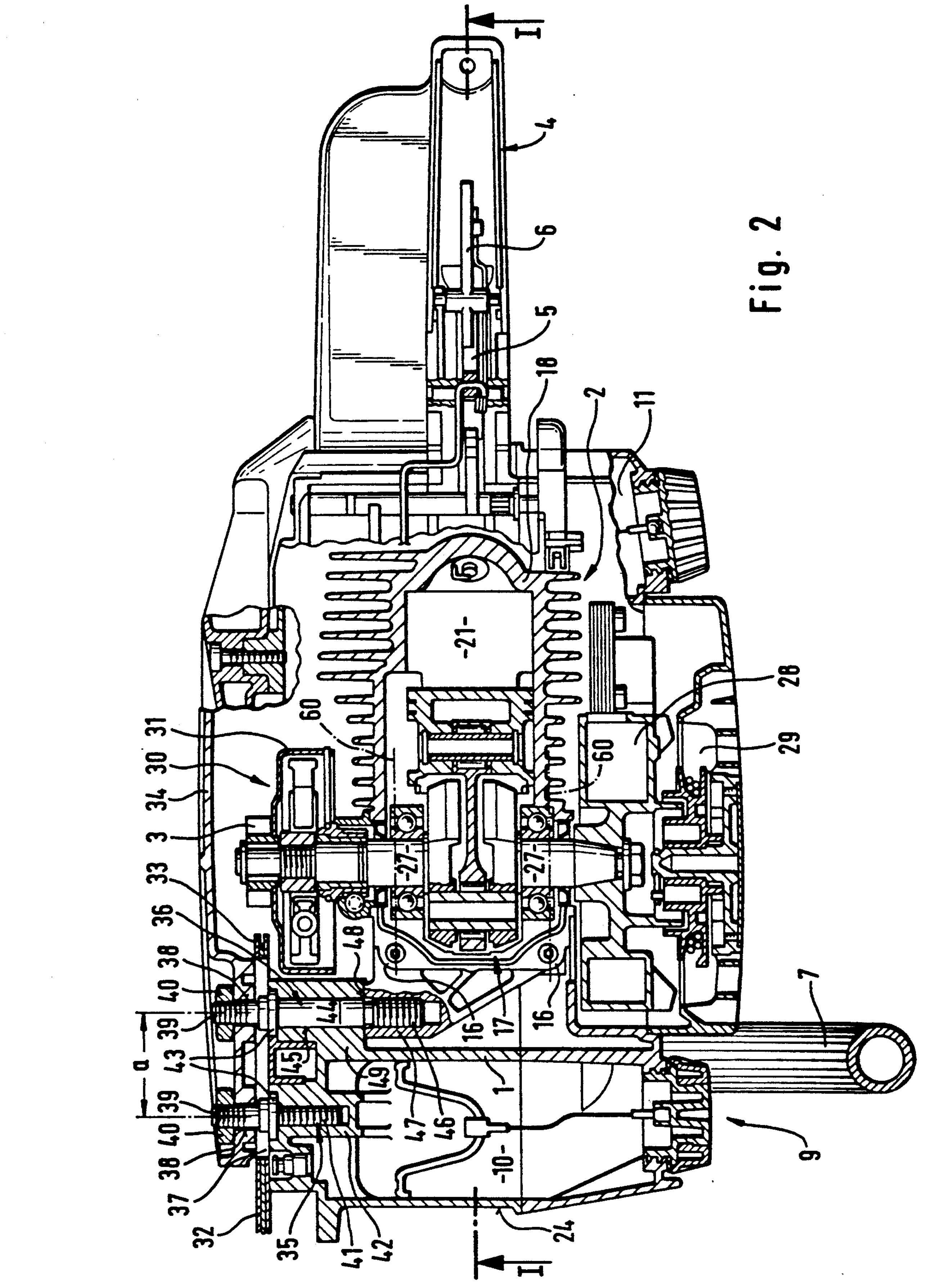

A forward oil tank 10 and a rearward fuel tank 11 each lie transversely to the longitudinal center axis of the housing 1. An attachment base 12 for the internal combustion engine 2 is provided between the forward oil tank 10 and the rearward fuel tank 11. The engine is seated with its crankcase made of metal on the attachment base 12 and is held there by attachment screws 14 which pass through receiving bores 13 in the attachment base 12 and engage into mounting appendages 16 of the crankcase 17. The engine 2 is fixedly held on the attachment base 12 of the housing 1 by four attachment screws 14. The attachment screws threadably engage the crankcase 17 at respective corners thereof. Each two attachment screws lying one behind the other in the longitudinal direction of the chain saw define a vertical plane 60 (FIG. 2). The attachment screws 14 defining plane 60 lie slightly inclined to the rearward handle 4.

The axis 19 of the engine determined by the cylinder 18 is slightly inclined toward the rearward handle 4. The inlet 20 faces toward the handle 4 and is supplied by a carburetor 22 with an air/fuel mixture. The outlet 23 of the combustion chamber 21 faces toward the forward end face 24 of the chain saw and opens into a muffler 25 having an outlet disposed below the hand guard 26 journalled forward of the forward handle 7.

As shown in FIG. 2, the crankshaft 27 of the engine is disposed transversely to the longitudinal center axis of the chain saw and approximately perpendicular to the planes 60. The end of the crankshaft 27 facing toward the lateral housing surface 9 supports a coolingair fan 28. A pull-rope starter 29 for starting the engine is also arranged at this end.

The other end of the crankshaft 27 carries a centrifugal clutch 30 having a coupling drum 31 fixedly connected to the sprocket wheel 3 so as to rotate therewith. The sprocket wheel 3 is in alignment with a guide bar 32 and drives a saw chain which runs on the periphery of the guide bar 32.

The guide bar 32 is a flat member and projects forwardly from the engine housing 1 in the longitudinal direction of the saw chain. The rearward end 33 of the guide bar 32 faces toward the sprocket wheel. The end 33 of the guide bar 32 is tightly clamped between the housing 1 and a sprocket wheel cover 34. For this purpose, two fixedly mounted stud bolts 35 and 36 are provided. The stud bolts 35 and 36 extend transversely to the longitudinal center axis of the chain saw and approximately perpendicular to the planes 60. The stud bolts 35 and 36 are spaced a distance (a) from each other when measured along the longitudinal direction of the motor-driven chain saw and are at approximately the same elevation with respect to each other. The stud bolts 35 and 36 extend through a longitudinal slot 37 in the rearward end 33 of the guide bar 32. The stud bolts 35 and 36 extend, in addition, through pass-through openings 38 in the sprocket wheel cover 34 and each have a thread winding at the free end thereof. The two stud bolts 35 and 36 carry respective nuts 40 which are turned tight to develop the clamping force for securely holding the guide bar 32.

The stud bolt 35 lying farther from the sprocket wheel 3 has an end facing away from the guide bar 32. On this end, a thread winding 41 is provided with which the stud bolt is threadably engaged in an attachment base 42 of the housing 1 until a collar 43 of the stud bolt 35 comes into contact engagement in a recess of the housing 1.

The other stud bolt 36 has a center section 44 without a thread winding and this stud bolt projects through a pass-through opening 45 in the housing 1 and is secured in the engine block of the engine 2 with its end 46 facing away from the guide bar. In the embodiment shown, the end 46 is threadably engaged in the engine block.

An attachment appendage 47 is preferably provided on the engine block for threadably engaging the stud bolt 36. This attachment appendage 47 is configured as a single piece with the engine block, for example, by being attached to the engine block in the form of a die casting. In the embodiment shown, the attachment appendage is formed on the lower crankcase shell 50 as one piece, for example, by casting, so that the engine 2 is fixed by the four attachment screws 14 on the base 12 in the region of the crankcase. The engine 2 is connected to a lateral housing base 49 by the stud bolts 36 lying approximately at right angles to the attachment screws. The engine is in this way tightly fixed in the housing 1.

The stud bolt 36 also has a collar 43 between the center section and the end 39 carrying the nut 40. The stud bolt 36 is threadably engaged in the attachment appendage 47 so far until the collar 43 comes into contact engagement in a recess of the housing 1 and lies against a supporting surface 48 of the attachment appendage 47 on the housing base 49. The contact face 48 faces toward the pass-through opening 45.

In this way, the housing base 49 is axially clamped between the contact face 48 of the attachment appendage 47 and the collar 43 of the stud bolt 36. The housing 1, the guide bar 32, the stud bolt 36 and the engine block of the engine 2 conjointly define a solid unit. The center section 44 advantageously is disposed without radial play in the pass-through opening 45. The stresses acting on the guide bar 32 are at least in part conducted directly into the engine block of the engine 2 via the stud bolt 36 whereby the loads on the housing 1 are reduced. The unit made of metal and comprising the guide bar, stud bolts and engine block operates in this manner to stiffen or reinforce the housing 1, which is made of plastic, by receiving forces.

In the embodiment shown, only one of the stud bolts (35, 36) is in engagement in the engine block of the drive motor. It can also be advantageous to permit all of the stud bolts (35, 36) for holding the guide bar 32 to engage in the engine block or attachment appendages 47 of the engine 2.

According to still another embodiment of the invention, attachment lugs (51, 52) are provided for attaching muffler 25, an oil pump (not shown) and the like.

It is understood that the foregoing description is that of the preferred embodiments of the invention and that various changes and modifications may be made thereto without departing from the spirit and scope of the invention as defined in the appended claims.

What is claimed is:

1. A motor-driven chain saw defining a longitudinal axis and comprising:

a drive motor having a motor block;

a housing for accommodating the drive motor therein;

a saw chain;

a guide bar extending in the direction of said axis and defining a guide path for guiding the saw chain in its movement around the guide bar;

said guide bar having a rearward end portion at which said guide bar is mounted on said housing;

a sprocket wheel disposed behind said rearward end portion and being in engagement with said saw chain; said sprocket wheel being operatively connected to said drive motor for driving said saw chain;

a sprocket wheel cover laterally covering said housing with said rearward end portion being disposed between said cover and said housing;

at least one stud bolt having a free end and extending through said rearward end portion and said sprocket wheel cover so as to cause said free end to extend through said sprocket wheel cover;

a nut arranged on said free end for clamping said rearward end portion between said cover and said housing;

said stud bolt having an anchor end opposite said free end;

said stud bolt having a mid section between said rearward end portion and said motor block;

said anchor end and said motor block conjointly defining holding means for tightly holding said stud bolt in said motor block;

said housing having a through opening formed therein;

said stud bolt extending through said through opening of said housing so as to be held firmly in said motor block by said holding means with said mid section being disposed in said through opening; and, said stud bolt having collar means formed thereon between said mid section and said free end for contact engaging said housing so as to axially clamp said housing to said motor block when said stud bolt is fixedly held in said motor block by said holding means.

2. The motor-driven chain saw of claim 1, said holding means comprising an internal thread formed in said motor block and an external thread formed on said anchor end for threadably engaging said internal thread thereby firmly anchoring said stud bolt in said motor block.

3. The motor-driven chain saw of claim 1, said mid section being disposed in said through opening without radial play.

4. The motor-driven chain saw of claim 1, said motor block having an attachment appendage and said holding means being conjointly defined by said anchor end and said attachment appendage.

5. The motor-driven chain saw of claim 4, said appendage being formed as a single piece with said motor block.

6. The motor-driven chain saw of claim 1, said drive motor being an internal combustion engine having a crankcase and said holding means being conjointly defined by said anchor end and said crankcase.

7. The motor-driven chain saw of claim 6, said crankcase having a lower crankcase shell and said holding means being conjointly defined by said anchor end and said lower crankcase shell.

8. The motor-driven chain saw of claim 7, said lower crankcase shell having an appendage and said appendage being cast as a single piece with said lower crankcase shell; and, said holding means being conjointly defined by said anchor end and said appendage.

* * * * *